(12) United States Patent
Feller et al.

(10) Patent No.: US 8,844,966 B2
(45) Date of Patent: Sep. 30, 2014

(54) VEHICLE SEATS FOR A MOTOR VEHICLE

(75) Inventors: Jens Feller, Illerkirchberg (DE); Torsten Schmidt, Berlin (DE); Peter Baumgartner, Günzburg (DE); Thomas Steck, Elchingen (DE)

(73) Assignee: Takata AG, Aschaffenburg (DE)

( * ) Notice: Subject to any disclaimer, the term of this patent is extended or adjusted under 35 U.S.C. 154(b) by 218 days.

(21) Appl. No.: 12/662,830

(22) Filed: May 5, 2010

(65) Prior Publication Data

US 2010/0283229 A1 Nov. 11, 2010

(30) Foreign Application Priority Data

May 6, 2009 (DE) .................. 10 2009 020 154

(51) Int. Cl.
*B60R 21/207* (2006.01)
*B60N 2/44* (2006.01)

(52) U.S. Cl.
CPC .............. *B60R 21/207* (2013.01); *B60N 2/449* (2013.01)
USPC .................. 280/730.2; 280/728.2; 297/284.9; 297/216.1

(58) Field of Classification Search
CPC ........... B60N 21/207; B60N 2021/207; B60N 2/449; B60N 2/4415
USPC .............. 280/730.2, 728.2; 297/284.9, 216.1, 297/216.13, 284.4; 296/65.16, 65.01
IPC ......................................................... B60N 2/64
See application file for complete search history.

(56) References Cited

U.S. PATENT DOCUMENTS

| 4,607,887 | A | | 8/1986 | Vail | |
| 4,965,899 | A | * | 10/1990 | Sekido et al. | 297/284.6 |
| 5,082,326 | A | * | 1/1992 | Sekido et al. | 297/284.6 |
| 5,280,997 | A | * | 1/1994 | Andres et al. | 297/284.9 |

(Continued)

FOREIGN PATENT DOCUMENTS

| CN | 2200564 (Y) | 6/1995 |
| DE | 10 2004 001 216 A1 | 7/2004 |

(Continued)

OTHER PUBLICATIONS

Notification of First Office Action Chinese Patent Application No. 201010174359.2 dated Jul. 2, 2013.

(Continued)

*Primary Examiner* — Paul N Dickson
*Assistant Examiner* — Joselynn Y Sliteris
(74) *Attorney, Agent, or Firm* — Foley & Lardner LLP

(57) ABSTRACT

A vehicle seat of a motor vehicle is provided. The vehicle seat comprises a backrest which includes a middle part and at least one side bolster, a gas bag module with a folded gas bag, which is at least partly arranged in the side bolster, an adjusting element for adjusting a width of the backrest, which is at least partly arranged in the side bolster and is movable relative to the middle part, by means of which the position of the side bolster relative to the middle part can be varied, and ascot frame extending in the side bolster, which in the vehicle seat mounted in the motor vehicle is aligned along the longitudinal axis of the vehicle. At least part of the folded gas bag is arranged before the seat frame with respect to the longitudinal axis of the vehicle.

2 Claims, 6 Drawing Sheets

(56) References Cited

U.S. PATENT DOCUMENTS

| | | | | |
|---|---|---|---|---|
| 6,129,419 A * | 10/2000 | Neale | ......................... | 297/284.4 |
| 7,232,174 B1 | 6/2007 | Trott | | |
| 7,458,603 B2 * | 12/2008 | Buono et al. | ............... | 280/728.2 |
| 7,641,226 B2 * | 1/2010 | Sundmark et al. | ......... | 280/730.2 |
| 7,708,343 B2 * | 5/2010 | Kayumi et al. | ............ | 297/284.9 |
| 7,726,733 B2 * | 6/2010 | Balser et al. | ............... | 297/216.1 |
| 7,963,553 B2 * | 6/2011 | Huynh et al. | .............. | 280/730.2 |
| 8,136,883 B2 * | 3/2012 | Rehfuss | ..................... | 297/284.9 |
| 2007/0057551 A1 * | 3/2007 | Lachenmann et al. | ..... | 297/284.9 |
| 2007/0158930 A1 | 7/2007 | Buono et al. | | |
| 2007/0252368 A1 | 11/2007 | Balser et al. | | |
| 2010/0283229 A1 | 11/2010 | Feller et al. | | |

FOREIGN PATENT DOCUMENTS

| | | |
|---|---|---|
| DE | 10307480 A1 | 9/2004 |
| DE | 103 40 508 A1 | 3/2005 |
| DE | 103 45 834 A1 | 4/2005 |
| DE | 10 2004 006 320 A1 | 9/2005 |
| DE | 10 2006 057 984 A1 | 7/2007 |
| DE | 10 2006 005 137 A1 | 8/2007 |
| DE | 102007012664 A1 | 9/2008 |
| DE | 10 2007 044 824 A1 | 4/2009 |
| DE | 10 2008 062 449 A1 | 5/2009 |
| DE | 102008062449 * | 5/2009 |
| DE | 10 2008 010 279 A1 | 8/2009 |
| GB | 2 397 047 B | 2/2006 |
| WO | WO 2006/128513 A1 | 12/2006 |
| WO | WO 2007/077035 A1 | 7/2007 |
| WO | WO 2009/039913 A1 | 4/2009 |

OTHER PUBLICATIONS

Chinese examination report dated Apr. 18, 2014; 8 pages.

* cited by examiner

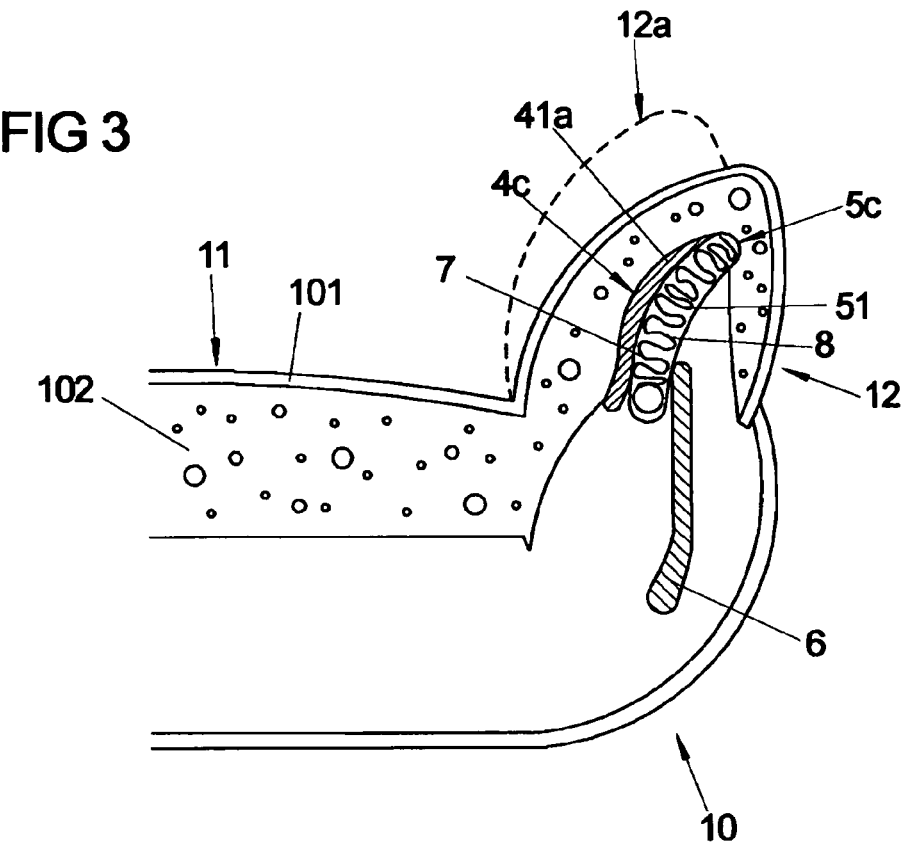
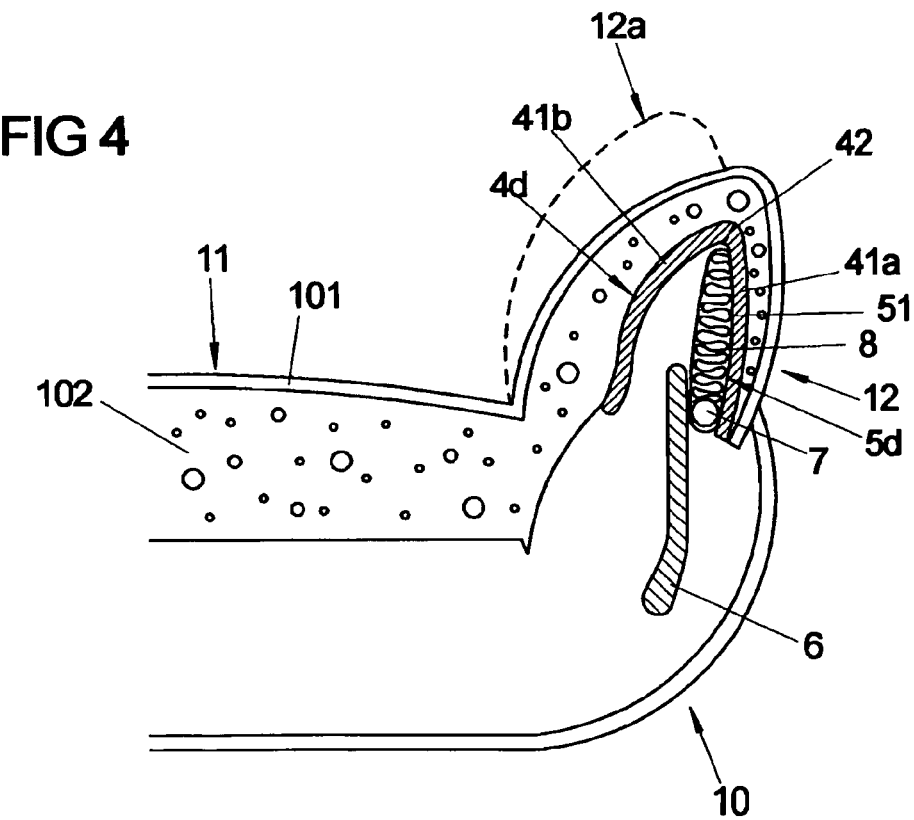

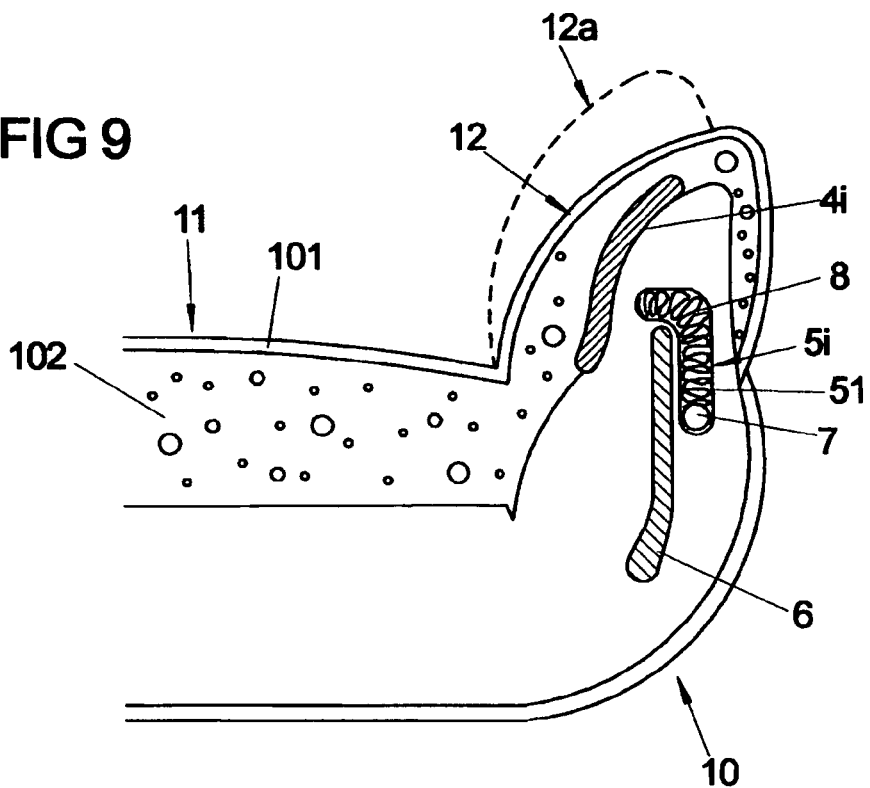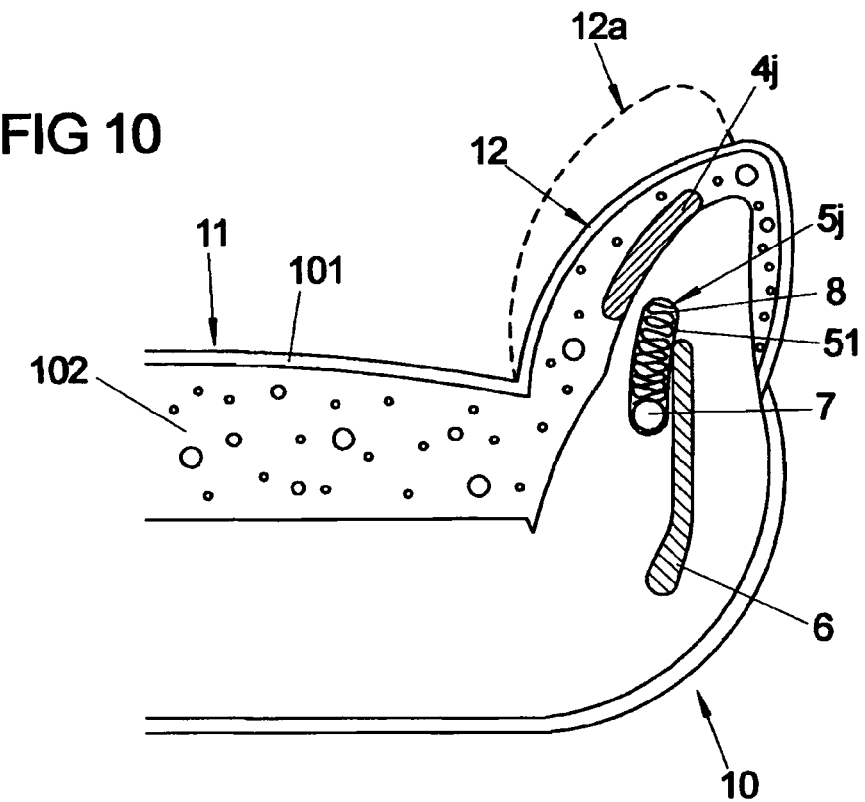

VEHICLE SEATS FOR A MOTOR VEHICLE

BACKGROUND

This invention relates to vehicle seats for a motor vehicle.

Such vehicle seats are known for example from DE 103 45 834 A1.

SUMMARY

The problem to be solved by the present invention consists in providing a vehicle seat with a backrest width adjustment which impedes the deployment of a gas bag arranged in the vehicle seat as little as possible.

According to an exemplary embodiment of the invention, it is provided to arranged at least part of the folded gas bag before the seat frame with respect to the longitudinal axis of the vehicle. Thus, the folded gas bag is arranged in the vehicle seat such that it is arranged as far forward as possible in the seat bolster with respect to the direction of travel. This involves the advantage that in the case of a deployment in direction of travel a shorter distance must be covered in the seat bolster and the exact direction of deployment can be specified in a better way. In some embodiments, it can be provided that the object of a structural coupling of the module to the seat structure wholly or partly is accomplished by the adjusting element of the backrest width adjustment. In some aspects, it can also be provided that the adjusting element or parts thereof serve as guiding means for the deploying gas bag and thus support a defined deployment in a desired direction.

In one exemplary aspect, the gas bag module is arranged in that side bolster which with respect to the vehicle seat mounted in the vehicle faces the longitudinal side of the vehicle closest to the vehicle seat. In principle, however, a gas bag module can be arranged in any one of the side bolsters or also in both side bolsters.

In one exemplary embodiment, the side bolster extends along the main direction of extension of the backrest, i.e. in the mounted vehicle seat substantially along the vertical direction, and protrudes forward from the middle part, in order to provide lateral support for a vehicle occupant sitting on the vehicle seat.

The side bolsters need not necessarily extend over the entire height of the backrest. In one embodiment, the side bolsters only extend in a region which is associated to a thorax or pelvis region of a vehicle occupant sitting on the seat. In another embodiment, the adjusting element is formed such that the backrest width is variable (e.g. also exclusively) in the region of the thorax and/or pelvis of a vehicle occupant. Such adjusting element can be arranged both in a side bolster, which substantially extends over the entire height of the backrest, and also in a shortened side bolster.

In one of the side bolsters the seat frame extends, which in the vehicle seat mounted in the motor vehicle is aligned along the longitudinal axis of the vehicle. The seat frame serves to contribute to the inner stability of the vehicle seat. In one embodiment, this seat frame extends over the entire height of the backrest at least for the most part.

The gas bag module comprises an inflatable folded gas bag. In one embodiment, it furthermore comprises a gas generator for inflating the gas bag in the case of activation. In addition, the gas bag and the gas generator can be surrounded by a module housing. In certain variants it likewise is provided to envelop the gas bag and/or the gas generator by means of a flexible casing. Such flexible casing represents a flexible module housing.

Due to the fact that at least part of the folded gas bag is arranged before the seat frame with respect to the longitudinal axis of the vehicle and that both the seat frame and at least the gas bag module which includes the gas bag are at least partly arranged in the side bolster, the gas bag is arranged such that in the case of activation of the gas bag module it can at least partly be deployed in and/or out of the side bolster close to a vehicle occupant sitting on the vehicle seat. Since the gas bag is at least partly arranged before the vehicle seat with respect to the longitudinal axis of the vehicle, the deployment of the gas bag is hardly impeded by the seat frame.

In one exemplary variant, this minimized hindrance of the gas bag of the gas bag module arranged in the vehicle seat is achieved in that the folded gas bag is completely arranged before the seat frame with respect to the longitudinal axis of the vehicle.

The gas bag module and the adjusting element can be equipped and arranged such that when moving the adjusting element to vary the position of the side bolster, the gas bag module is also moved. For this purpose, for example, a module housing is connected with the adjusting element.

The adjusting element can at least partly enclose the gas bag module. In particular, this can be realized such that the gas bag module includes a module housing which at least with a part of its surface is in contact with the adjusting element, in particular rests against the adjusting element.

In one exemplary embodiment of the invention, the adjusting element is formed by the module housing of the gas bag module. This embodiment is advantageous in particular because apart from the module housing no adjusting element is necessary which might impede the deploying gas bag in the case of activation. By moving the module housing, the relative position of the side bolster with respect to the middle part can be adjusted and hence the backrest width can be adjusted. For the stable construction of the module housing of the gas bag module as an adjusting element, the module housing can be formed of rigid material, in particular of a rigid plastic material.

In one exemplary embodiment, the module housing of the gas bag module is pivotable about an axis, which substantially corresponds with the longitudinal axis of the gas generator. This configuration can be used in particular with the above-mentioned construction, in which the module housing forms the adjusting element. For example, the gas generator constitutes a tubular gas generator. The gas generator can be mounted in the vehicle seat such that in the case of a proper movement of the gas bag module for adjusting the backrest width, the module housing is swiveled about this axis together with the gas generator. For this purpose, for example, power-driven adjusting means are provided.

The gas bag module and/or the folded gas bag can at least partly, in particular for the most part, i.e. along most of the length of the gas bag packet of the folded gas bag, be arranged on that side of the seat frame with respect to the transverse axis of the vehicle which faces the middle part. In such variant, the arrangement of the gas bag is made such that in the case of activation it is at least partly deployed between the seat frame and the middle part and hence particularly close to a vehicle occupant sitting on the vehicle seat, who sits leaned e.g. at the middle part. In one embodiment, the gas bag in particular can support on the seat frame during deployment and thereby at least partly be aligned in a preferred direction during deployment, which is directed towards the vehicle occupant.

Alternatively, it can also be provided that the folded gas bag is at least partly arranged on that side of the seat frame with respect to the transverse axis of the vehicle which faces away from the middle part.

The adjusting element can at least partly, in particular for the most part or completely, be arranged before the seat frame with respect to the longitudinal axis of the vehicle.

In addition, the adjusting element can at least partly, in particular for the most part or completely, be arranged before the folded gas bag with respect to the longitudinal axis of the vehicle. In such a variant, the adjusting element in particular can be arranged such that it defines a preferred direction (in particular variable by a movement of the adjusting element) for the deployment of the gas bag in the case of activation, as soon as the gas bag is deployed forward with respect to the longitudinal axis of the vehicle. The adjusting element thus can have a steering effect for the deploying gas bag.

Alternatively, in one exemplary embodiment, the folded gas bag can at least partly, in particular for the most part or completely, be arranged before the folded adjusting element with respect to the longitudinal axis of the vehicle. In this alternative embodiment, the gas bag can be deployed relatively unimpeded by the adjusting element in the case of activation in direction before the adjusting element with respect to the longitudinal axis of the vehicle.

The adjusting element can at least partly, in particular for the most part or completely, be arranged on that side of the seat frame which faces the middle part with respect to the transverse axis of the vehicle. In such variant, the adjusting element can be arranged such that it is movable and supports on the seat frame during this movement, which in particular can be a rotary movement.

In one exemplary aspect, the adjusting element has at least two legs which at least approximately extend in longitudinal direction of the vehicle and between them form a space in which the gas bag module and/or the seat frame are arranged at least in part, in particular for the most part or completely. In such variant, a preferred direction can be defined by the positioning of the legs and the gas bag module at least partly arranged between the same, in which the gas bag of the gas bag module is deployed in the case of activation.

In one exemplary variant, the two legs are part of the substantially U-shaped or V-shaped adjusting element, which is arranged in the vehicle seat such that the connecting region of the two legs points forward with respect to the longitudinal axis of the vehicle. In such variant it can be achieved by the positioning of the connecting region and the arrangement of at least part of the gas bag module with the folded gas bag that a preferred direction is defined, in which the gas bag of the gas bag module is deployed in the case of activation. For this purpose, the adjusting element can include a tear line or the like, along which the two legs of the adjusting element can at least partly be separated in the case of activation, wherein the folded gas bag is at least partly deployed in the case of activation through the space obtained between these two legs.

In one exemplary variant, the gas bag module and/or the adjusting element are at least partly surrounded by a padding of the vehicle seat. This padding can be formed e.g. by means of a foam. It can be provided here that the padding includes a predetermined channel along which a gas bag of the correspondingly positioned gas bag module is at least partly deployed in the case of activation. In this way, a preferred direction can be defined, in which the gas bag of the gas bag module is deployed in the case of activation. This is achieved for example in that the channel in the padding is formed such that it provides less resistance to the deploying gas bag than the padding surrounding the channel or channel base. Such channel can be formed e.g. by indentations in the padding or by a multipart structure of the padding, wherein the channel is formed e.g. by the region between at least two adjoining parts of the padding.

In one exemplary variant, it is provided that such padding with a channel is arranged relative to an adjusting element and the gas bag module such that the gas bag deploying in the case of activation is deployed along a tear line between two legs of the adjusting element at least partly through the space obtained thereby and then is deployed through the padding along the channel substantially arranged subsequent to this space.

In one exemplary embodiment, the adjusting element and the gas bag module are formed and arranged in the vehicle seat such that upon deployment in the case of activation the gas bag exerts a force on the adjusting element and supports on the same. Due to the arrangement of the adjusting element and the gas bag module or gas bag with respect to each other, a preferred direction thus can be defined for the deployment of the gas bag in the case of activation.

The gas bag module can include a module housing, which can extend substantially straight along a main direction of extension. Alternatively, the module housing of the gas bag module can also be curved, in particular have an L-shape. The module housing can be constructed in one piece or in several pieces.

In one exemplary embodiment, the gas bag module, in particular the folded gas bag, and/or the adjusting element are arranged substantially parallel to the longitudinal axis of the vehicle or a direction of extension of the side bolster. If the gas bag module includes a module housing, a direction of extension of the module housing of this embodiment can be arranged substantially parallel to the longitudinal axis of the vehicle or a direction of extension of the side bolster.

The adjusting element can be movable in a direction transverse to the main direction of extension of the side bolster and/or the backrest and/or be pivotable about an axis parallel to the main direction of extension of the side bolster and/or the backrest. The adjusting element here can include one or more legs.

In one exemplary variant of the invention, the adjusting element can be arranged and fixed in the vehicle seat such that it is rotatable about an axis of rotation substantially stationary with respect to the vehicle seat. By rotating about this axis of rotation, the position of the adjusting element and hence the position of the side bolster relative to the middle part can be varied, so that an adjustment of the backrest width can be effected by such rotation.

In accordance with a further aspect of the invention a vehicle seat is provided, which is provided with
- a backrest which includes a middle part and at least one side bolster,
- a gas bag module with a folded gas bag and a module housing, which is at least partly arranged in the side bolster,
- an adjusting element for adjusting a width of the backrest, which is at least partly arranged in the side bolster and is movable relative to the middle part, by means of which the position of the side bolster relative to the middle part can be varied, wherein the adjusting element is formed by a module housing of the gas bag module.

The fact that the module housing of the gas bag module forms the adjusting element in particular is advantageous, because apart from the module housing no adjusting element is necessary which might impede the deploying gas bag in the case of activation. In one embodiment, the invention therefore is characterized in that the module housing is the only adjusting element which is (at least partly) arranged in the side bolster.

In the seat in accordance with the invention, the relative position of the side bolster with respect to the middle part is adjustable and hence the backrest width is adjustable by a movement of the module housing. For the stable construction of the module housing of the gas bag module as an adjusting element, the module housing can be formed of rigid material, in particular of a rigid plastic material.

In one exemplary embodiment it can be provided that the module housing and hence the gas bag module as a whole is pivotally mounted about an axis.

In one exemplary embodiment, the module housing of the gas bag module is pivotable about an axis which corresponds with the longitudinal axis of the gas generator, which in this embodiment constitutes a tubular gas generator. The gas generator can be mounted in the vehicle seat such that in the case of a proper movement of the gas bag module for adjusting the backrest width, the gas generator, in particular exclusively, can be swiveled about this axis.

In accordance with a further aspect of the invention a vehicle seat is provided, which is provided with a backrest which includes a middle part and at least one side bolster, a gas bag module with a folded gas bag and a module housing, which is at least partly arranged in the side bolster, an adjusting element for adjusting a width of the backrest, which is at least partly arranged in the side bolster and is movable relative to the middle part, by means of which the position of the side bolster relative to the middle part can be varied, wherein the adjusting element at least partly encloses the gas bag module.

The adjusting element at least partly encloses the gas bag module. In particular, this can be effected such that at least with a part of its surface the module housing is in contact with the adjusting element, in particular rests against the adjusting element.

In one exemplary embodiment, the module housing is formed such that it is connected with the adjusting element. Alternatively, the module housing can be configured such that it is not connected with the adjusting element. If the adjusting element rests against the module housing, it need not necessarily be connected with the adjusting element.

In one exemplary embodiment, the adjusting element encloses the gas bag module such that it completely—at least in an imaginary sectional plane—lies around the module housing. This means that an opening is formed in the adjusting element, which at least extends through a part of the module housing of the gas bag module. The limitation to the sectional plane means that the module housing need not completely three-dimensionally be enclosed by the adjusting element. In one variant, the module housing is completely three-dimensionally enclosed by the adjusting element.

In accordance with a further aspect of the invention a vehicle seat is provided, which is provided with a backrest which includes a middle part and a side bolster, a gas bag module with a folded gas bag, which is at least partly arranged in the side bolster, an adjusting element for adjusting a width of the backrest, which is at least partly arranged in the side bolster and is movable relative to the middle part, by means of which the position of the side bolster relative to the middle part can be varied, and a seat frame extending in the side bolster, which in the vehicle seat mounted in the motor vehicle is aligned along the longitudinal axis of the vehicle, wherein the folded gas bag at least for the most part is arranged on that side of the seat frame which faces the middle part with respect to the transverse axis of the vehicle.

Due to this arrangement of the folded gas bag with respect to the seat frame a preferred direction can be defined, in which the gas bag is deployed in the case of activation. In one embodiment, the gas bag in particular can support on the seat frame during deployment and thereby at least partly obtain a preferred direction during deployment. In particular, it thus can be ensured that the gas bag is deployed in direction of a vehicle occupant sitting on the vehicle seat, who is leaned e.g. at the middle part of the vehicle seat.

BRIEF DESCRIPTION OF THE DRAWINGS

The invention will subsequently be explained in detail by means of embodiments with reference to the Figures.

FIG. 3 schematically shows a sectional drawing through a vehicle seat in accordance with a third embodiment, in which a gas bag module and an adjusting element for adjusting the backrest width for the most part are arranged before a seat frame with respect to the longitudinal axis of the vehicle.

FIG. 4 schematically shows a sectional drawing through a vehicle seat in accordance with a fourth embodiment, in which a gas bag module is arranged between two legs of a substantially V-shaped adjusting element for adjusting the backrest width;

FIG. 9 schematically shows a sectional drawing through a vehicle seat in accordance with a ninth embodiment, in which a substantially L-shaped gas bag module is arranged at a seat frame.

FIG. 10 schematically shows a sectional drawing through a vehicle seat in accordance with a tenth embodiment, in which a substantially oblong gas bag module is arranged substantially parallel to the longitudinal axis of the vehicle and a seat frame which extends along the longitudinal axis of the vehicle.

DETAILED DESCRIPTION

Figure 1:
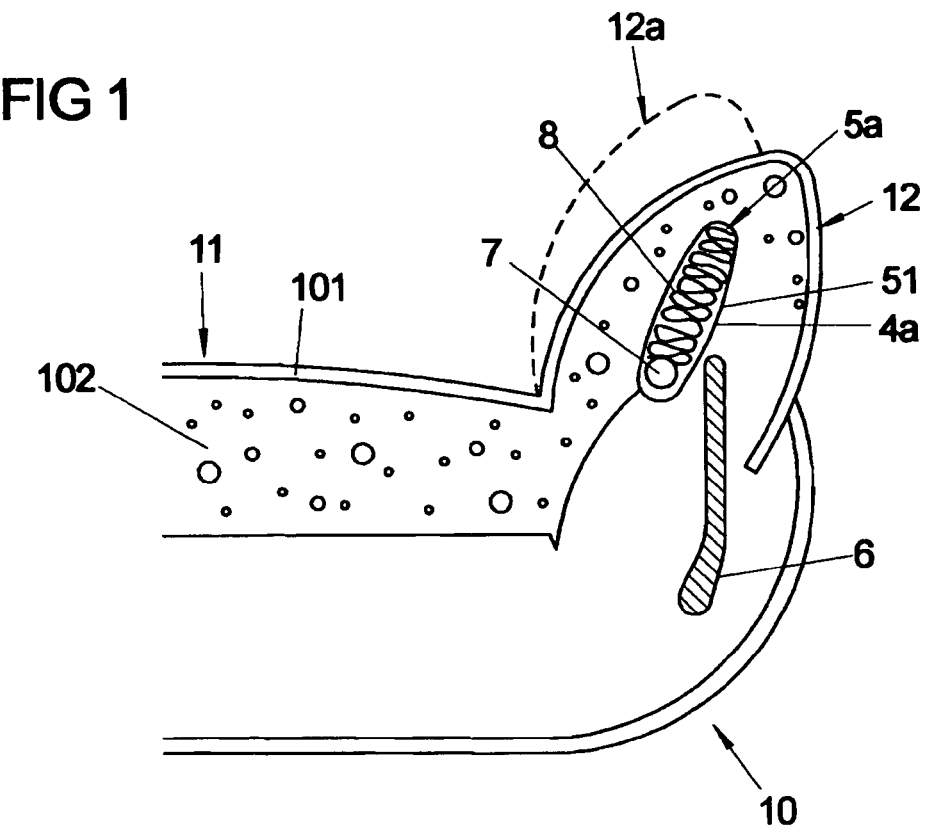
FIG. 1 schematically shows a sectional drawing through a vehicle seat in accordance with a first embodiment, in which an adjusting element for adjusting the backrest width is formed by a module housing of a gas bag module.

FIG. 1 shows a schematic sectional drawing through the backrest 10 of a vehicle seat in accordance with a first embodiment. Here, the sectional plane extends vertically to the main direction of extension of the backrest 10. The illustrated sectional drawing only depicts part of the section. In particular, it can be provided that the Figure only shows one half of the section through the vehicle seat and the other half is formed mirror-symmetrically with respect to the illustrated half.

The backrest includes a middle part 11 which is laterally defined by a side bolster 12. In a mirror-symmetrical construction, the middle part 11 additionally is defined by a further side bolster 12, which is symmetrically opposite to the first side bolster 12 with respect to the middle part 11. The seat is mounted in the vehicle (not shown) such that the side bolster 12 faces a longitudinal side of the vehicle. In the case of a symmetrical configuration of the vehicle seat, the two side bolsters thus are located opposite to each other along the transverse direction of the vehicle.

The side bolster 12 is formed such that one portion thereof protrudes from the middle part 11 in a direction along the longitudinal axis of the vehicle, so that it laterally supports a vehicle occupant sitting on the seat (not shown). To the front, the backrest 10 forms a leaning surface 101 for a vehicle occupant, which is adjoined by a padding 102 made of foam covered with a seat cover.

Laterally of the middle part 11, i.e. based on the mounted condition of the vehicle seat in transverse direction of the vehicle spaced from the middle part 11, the seat frame 6 is arranged, which substantially extends along the main direction of extension of the backrest 10 and which in cross-section each has an oblong shape oriented along the longitudinal direction of the vehicle. The seat frame 6 each extends from a rear region of the backrest 10 along the longitudinal direction of the vehicle into the side bolster 12.

It should be noted that the seat frame can be connected with further non-illustrated components of a seat frame of the vehicle seat.

The vehicle seat is equipped with adjusting means, in particular an adjusting element 4a to 4k, for adjusting the width of the backrest, wherein in particular the position of the side bolster 12 with respect to the middle part 11 can be varied by the adjusting means, in order to be able to adapt the vehicle seat to the body contours of a vehicle occupant.

The variability of the position of the side bolster 12 relative to the middle part 11 is indicated in FIG. 1 in that a broken line 12a indicates a changed relative position of the side bolster 12 with respect to the middle part 11.

The structure of the vehicle seat described so far, in particular the arrangement of the middle part 11 relative to the side part 12 and the presence and positioning of the seat frame 6, is not only realized in FIG. 1, but is also realized in FIGS. 2 to 11.

In FIG. 1, a gas bag module 5a is arranged in the side bolster 12 in addition to the seat frame 6, which includes a gas generator 7 and a gas bag 8. In addition, the gas bag module 5a comprises a module housing 51, which surrounds the folded gas bag 8 and the gas generator 7 for inflating the gas bag. Like the other components, the module housing is illustrated schematically. It can have a shape other than illustrated, for example be formed substantially rectangular in section. Furthermore, it can be formed in one piece or in several pieces.

In the vehicle seat shown in FIG. 1, this module housing 51 forms an adjusting element which serves to adjust the width of the backrest. By using the module housing 51 as adjusting element, the position of the side bolster 12 relative to the middle part 11 is defined in particular. The module housing is movable such in its relative position with respect to the middle part and the seat frame 6 and is of such a stability that via a movement, in particular a rotary or swivel movement, the relative position of the side bolster 12 with respect to the middle part 11 can be varied. In particular, the gas bag module is pivotable about an axis which corresponds with the longitudinal axis of the gas generator 7 constituting a tubular gas generator; in this way, the side bolsters are positioned.

The module housing 51 of the gas bag module 5a for the most part is arranged before the seat frame 6 with respect to the seat frame 6 and extends into the side bolster 12. One part of the module housing 51 is arranged in longitudinal direction of the vehicle such that it extends beside the part of the seat frame 6. With respect to the transverse axis of the vehicle, this part of the module housing 51 also is arranged on the side of the seat frame 6 extending in longitudinal direction of the vehicle, which faces the middle part 11.

The gas bag module 5a is formed and arranged such that in the case of activation the gas bag 8 in the vehicle seat mounted in the motor vehicle substantially is deployed in forward direction of the vehicle. In FIG. 1, the gas bag module 5 is at least partly surrounded by a padding 102 of the backrest 10.

In one aspect, the module housing forming the adjusting element and the module as a whole are structurally connected with the seat frame 6, for example via a non-illustrated holding element. This is also true for the embodiments of the following Figures.

Figure 2:
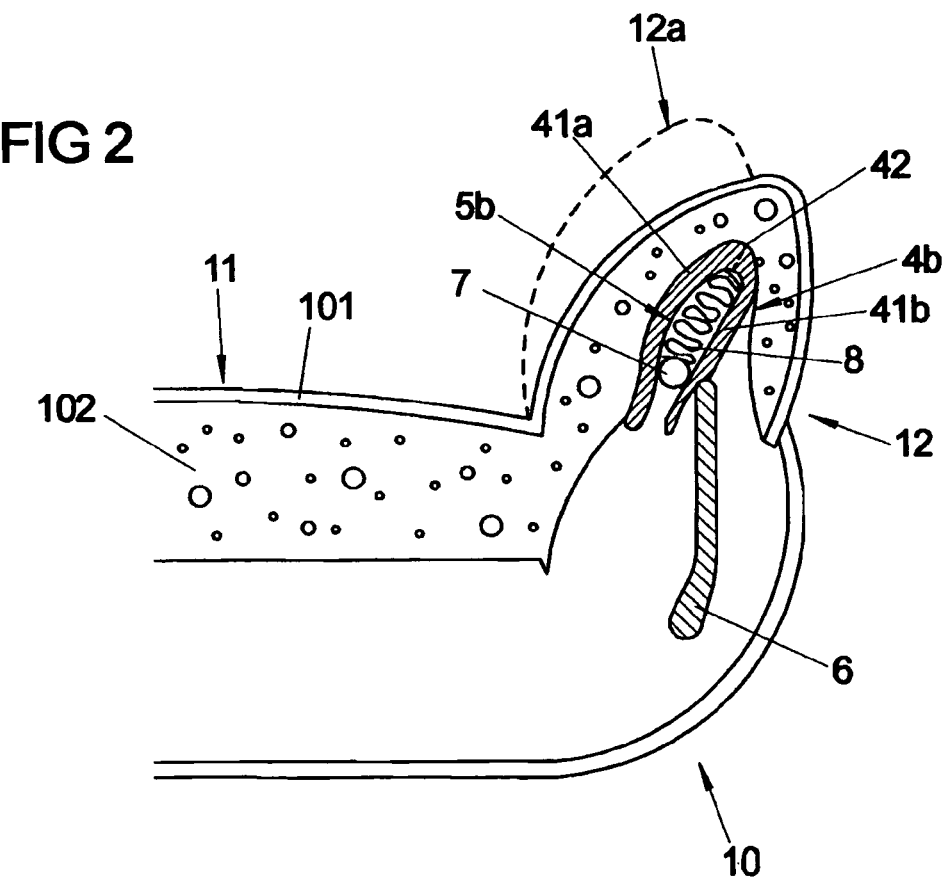
FIG. 2 schematically shows a sectional drawing through a vehicle seat in accordance with a second embodiment, in which a gas bag and a gas generator are at least partly enclosed by two legs of an adjusting element.

FIG. 2 shows a sectional drawing through the backrest 10 of a vehicle seat, wherein the vehicle seat comprises an adjusting element for adjusting the width of the back rest 10. In the side bolster 12 a gas bag module 5b is arranged beside the adjusting element 4b, which comprises a gas generator 7 and a gas bag 8. The adjusting element 4b of FIG. 2 includes a first leg 41a and a second leg 42a, which are integrally formed with each other and which at least partly surround the gas generator 7 and the gas bag 8 in the sectional plane. The two legs of the adjusting element 4b are arranged such that they are positioned before the seat frame 6 with their largest part each in direction of the longitudinal axis of the vehicle, which extends along the longitudinal axis of the vehicle. The leg 41b is positioned at the seat frame 6 such that it supports on the seat frame 6. The leg 41b and the leg 41a are movable with respect to the middle part and with respect to the seat frame 6, so that via their movement the relative position of the side bolster 12 with respect to the middle part 11 can be varied. In particular during a movement, the leg 41b can support on the seat frame in a contact region, so that the adjusting element 4b can be rotated about an axis through this contact region.

Between the two legs, the gas bag module 5 with the gas generator 7 is arranged in the sectional plane. One part of the two legs 41a and 41b of the adjusting element 4b each extends in the region located between the seat frame 6 and the middle part 11 of the vehicle seat.

Figure 5:
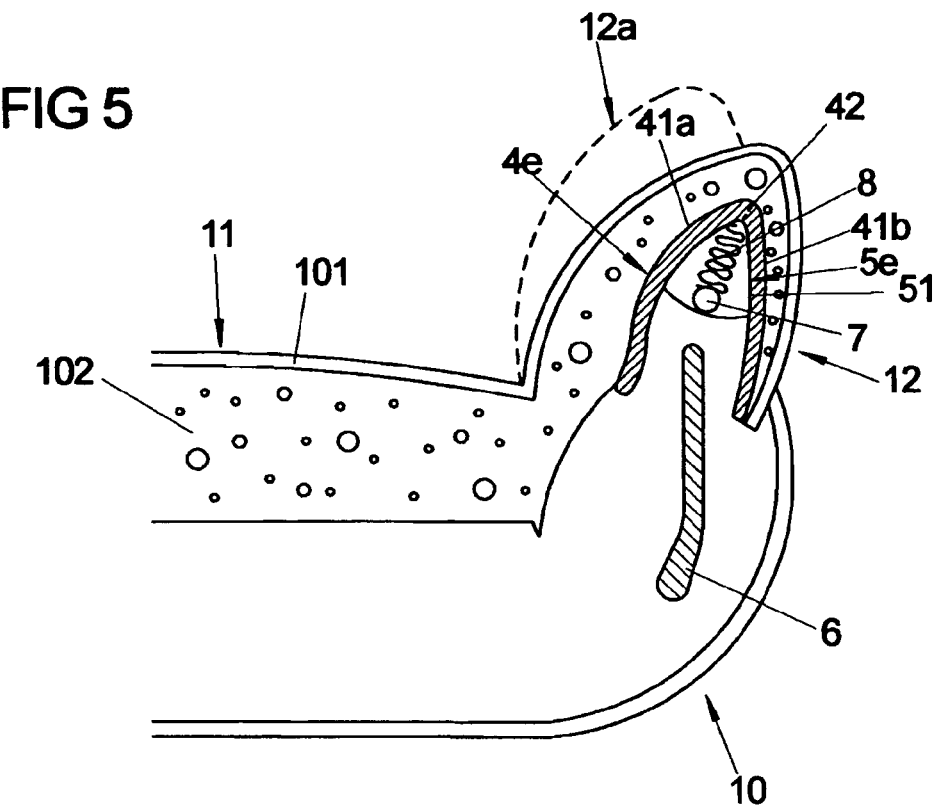
FIG. 5 schematically shows a sectional drawing through a vehicle seat in accordance with a fifth embodiment, in which a gas bag module is arranged between two legs of a substantially V-shaped adjusting element for adjusting the backrest width.
Figure 6:
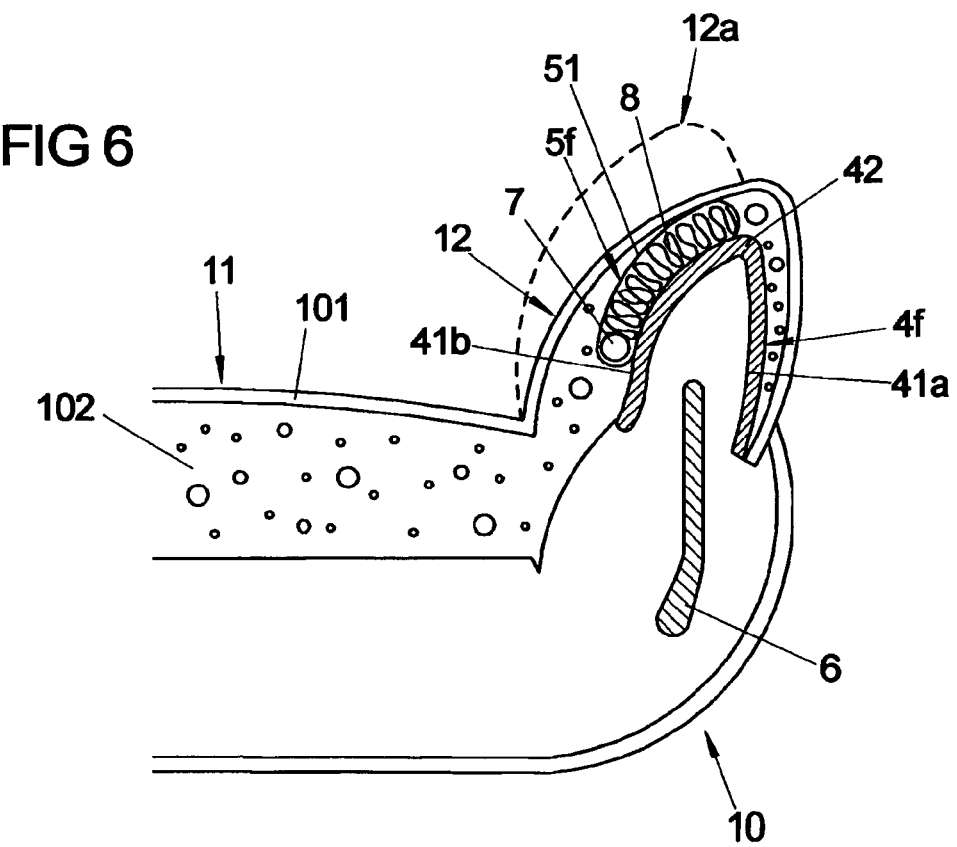
FIG. 6 schematically shows a sectional drawing through a vehicle seat in accordance with a sixth embodiment, in which a gas bag module is arranged at one of two legs of a substantially V-shaped adjusting element for adjusting the backrest width.

In the embodiment depicted in FIG. 2, a break-up edge 42 indicated by a broken line is shown in the legs 41a and 41b of the adjusting element 4b, at which the two legs 41a and 41b abut against each other. The region of the break-up edge is formed such that the break-up edge is broken up by the deploying gas bag 8 in the case of activation (not depicted). In the case of activation, the gas bag 8 hence at least partly is deployed through this region. Such break-up edge 42 likewise is depicted in FIGS. 4, 5 and 6. Instead of one, a plurality of break-up edges or other break-up structures can also be provided.

FIG. 3 shows a section through a vehicle seat which includes a gas bag module 5c which comprises a gas generator 7 and a gas bag 8, which are surrounded by a module housing 51. In the vehicle seat mounted in a motor vehicle, the gas bag module 5c and the gas bag 8 for the most part are arranged before the seat frame 6 with respect to the longitudinal axis of the vehicle.

Part of the gas bag module 5c is arranged along the transverse axis of the vehicle on that side of the seat frame 6 which faces the middle part. On the side of the gas bag module 5c which faces the middle part of the vehicle seat along the transverse axis of the vehicle, an oblong leg 41a is arranged on the module housing 51, which forms the adjusting element 4c. This leg for the most part is arranged before the seat frame with respect to the longitudinal axis of the vehicle.

The adjusting element 4c of the vehicle seat serves to adjust the width of the backrest 10. The gas bag module 5c is curved and positioned relative to the leg 41a of the adjusting element 4 such that in the case of activation the deploying gas bag 8 is deployed in a preferred direction which is directed forward with respect to the longitudinal axis of the vehicle and away from the middle part 11 with respect to the transverse axis of the vehicle.

FIG. 4 shows a section through a backrest 10 of a vehicle seat, wherein a gas bag module 5d is arranged in the side bolster 12, which comprises a gas generator 7 and a gas bag 8 which are enclosed by a module housing 51. The gas bag module is arranged such that it extends before the same into the side bolster 12 for the most part with respect to the seat frame 6.

The vehicle seat which is depicted in FIG. 4d includes an adjusting element 4 for adjusting the width of the backrest 11 of the vehicle seat, which comprises two legs 41a and 41b and which is arranged in the side bolster 12 relative to the gas bag module 5 such that it is connected with the gas bag module 5 on one side of the module housing 51, namely such that the leg 41a is connected with a side of the module housing 51 and the holding leg 41b protrudes from this module housing such that it extends in the side bolster 12 away from the module housing 51 and from the other leg 41a.

The leg 41b is formed such that it is movable relative to the middle part of the vehicle seat and that a movement of the leg 41b effects a change in the relative position of the side bolster 12 with respect to the middle part 11. It can be provided that the leg 41a is movable relative to the middle part 11.

The two legs 41a and 41b are arranged such that they enclose a region in which the gas bag module 5d is arranged. The gas bag module 5d is arranged relative to the seat frame 6 such that the gas bag module for the most part extends along the longitudinal direction before the part of the seat frame and with an end portion, in which the gas generator 7 is disposed, is arranged at the level of the seat frame 6 in longitudinal direction of the vehicle. In particular, the gas bag module is of oblong shape and aligned such that it is arranged substantially parallel to the direction of longitudinal extension of the vehicle or to the seat frame 6.

With respect to the part of the longitudinal frame which extends along the longitudinal axis of the vehicle, the gas generator 5d is arranged such that it is disposed on that side of the seat frame 6 which faces away from the middle part 11 with respect to the transverse axis of the vehicle. On this side, the leg 41a also adjoins the gas bag module 5. The legs 41a and 41b are formed such that they engage around a part of the seat frame 6, which extends along the transverse axis of the vehicle, on two sides which are located opposite each other along the transverse axis of the vehicle with respect to the part of the seat frame 6. Engage around here means that the part of the seat frame 6 lies between the legs 41a and 41b. The legs 41a and 41b approximately form a V-shape in their position with respect to each other.

FIG. 5 shows a vehicle seat with a gas bag module 5e which comprises a gas bag 8 and a gas generator 7, which are surrounded by a module housing 51. The gas bag module 5e is arranged in the side bolster 12 completely before the seat frame 6 with respect to the longitudinal axis of the vehicle, which in the vehicle seat 6 mounted in the motor vehicle extends along the longitudinal axis of the vehicle. The gas bag module 5 is arranged in the side bolster 12.

The vehicle seat in addition includes an adjusting element 4e in the side bolster 12, which serves to adjust the width of the backrest and whose position relative to the middle part can be varied such that by varying the position of the adjusting element the position of the side bolster 12 relative to the middle part 11 can be varied.

The adjusting element 4e includes two legs 41a and 41b. The same are integrally connected with each other and extend along two sides of the module housing 51 of the gas bag module 5e, wherein the gas bag module 5e is arranged such that it extends between the two legs and that it fills a partial region between these two legs in a section vertical to the main direction of extension of the backrest 10 of the vehicle seat.

Varying the position of the side bolster 12 is effected e.g. by swiveling one of the legs 41a or 41b of the adjusting element and hence of the side bolster 12. This swiveling takes place about an axis which extends parallel to the vertical extension of the backrest 10 through the region of the two legs 41a and 41b which connects the two legs 41a and 41b with each other. The two legs 41a, 41b are arranged such with respect to the part of the seat frame 6 which in the vehicle seat mounted in the motor vehicle extends along the longitudinal axis of the vehicle, that the one leg 41a partly extends on a side which with respect to the transverse axis of the vehicle lies on the side of the middle part 11 of the vehicle seat and the other leg 41b is arranged on the side facing away from the middle part with respect to the transverse axis of the vehicle.

The gas bag module 5e includes a module housing 51 which with a part of one of its side walls each rests against the legs 41a and 41b. In the region connecting the two legs 41a and 41b with each other a break-up edge is provided and arranged such that in the case of activation of the gas bag module 5e it can be penetrated by the deploying gas bag.

FIG. 6 shows a sectional drawing through the backrest 10 of a vehicle seat which comprises a gas generator 7 and a gas bag 8, which are part of a gas bag module 5f, wherein the gas generator 7 and the gas bag 8 are surrounded by a module housing 51. With respect to the direction of longitudinal extension of the motor vehicle, the gas generator 7 here is completely arranged before the part of the seat frame 6 which substantially extends along the longitudinal axis of the vehicle.

The gas bag module 5f is connected with a leg 41b of an adjusting element 4f which includes two legs 41a and 41b. The adjusting element 4f is arranged in the side bolster 12 of the seat and serves to vary the relative position of the side bolster 12 with respect to the middle part 11 in that it is movable and a movement of the adjusting element, in particular a movement of one of the two legs of the adjusting element, leads to a relative movement of the side bolster 12 relative to the middle part 11, by means of which the width of the backrest 10 can be adjusted.

The gas bag module 5*f* is arranged on that side of the leg 41*b* with the module housing 51 which faces the middle part 11. The two legs of the adjusting element 4 for the most part extend along the direction of longitudinal extension before the seat frame 6. One of the end portions each of the legs 41*a* and 41*b* extends relative to the part of the seat frame 6 on one of the sides which are facing or facing away from the middle part 11 of the vehicle seat. The part of the seat frame thus lies between the two legs 41*a*, 41*b*. When adjusting the seat width by adjusting the relative position of one or both of the legs 41*a* and 41*b* with respect to the middle part 11, the gas bag module 5*f* can also be moved due to the fact that the gas bag module 5*f* is connected with one of the two legs, namely with the leg 41*b*. At the same time, a variation of the relative position of the side bolster relative to the middle part 11 is effected.

The two legs 41*a* and 41*b* in part engage around the seat frame 6 on two sides which are located opposite each other. One of these sides faces the middle part of the vehicle seat, the other side faces away from the middle part of the vehicle seat. The legs 41*a* and 41*b* approximately form a V-shape in their position with respect to each other.

Figure 7:
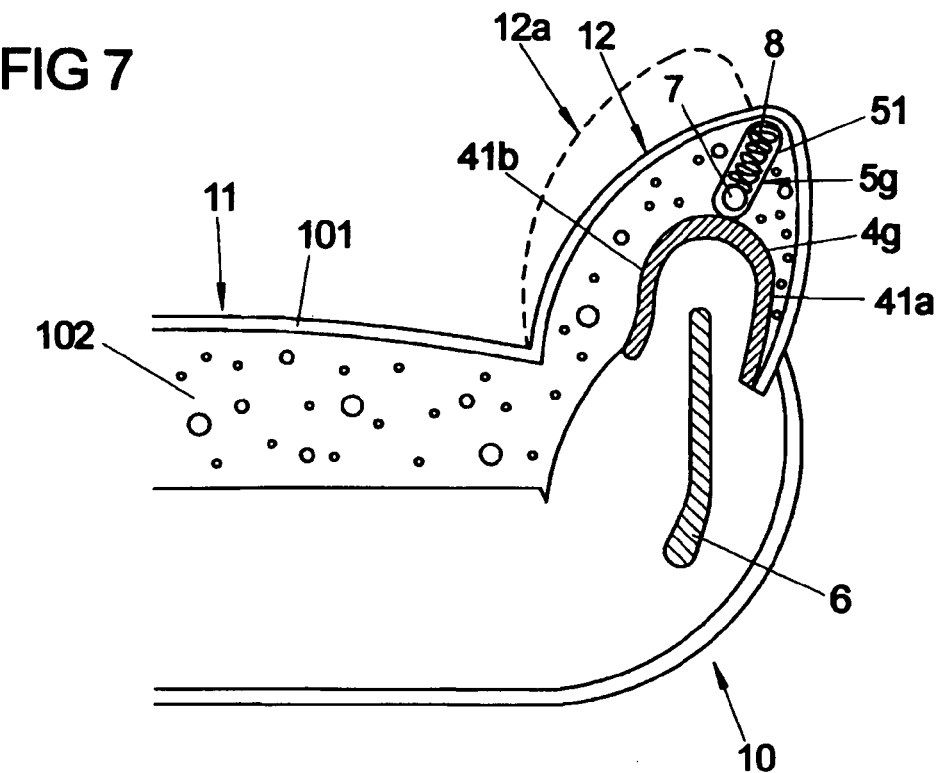
FIG. 7 schematically shows a sectional drawing through a vehicle seat in accordance with a seventh embodiment, in which a gas bag module is arranged before a seat frame and before a substantially U-shaped adjusting element for adjusting the backrest width with respect to the longitudinal axis of the vehicle.
Figure 8:
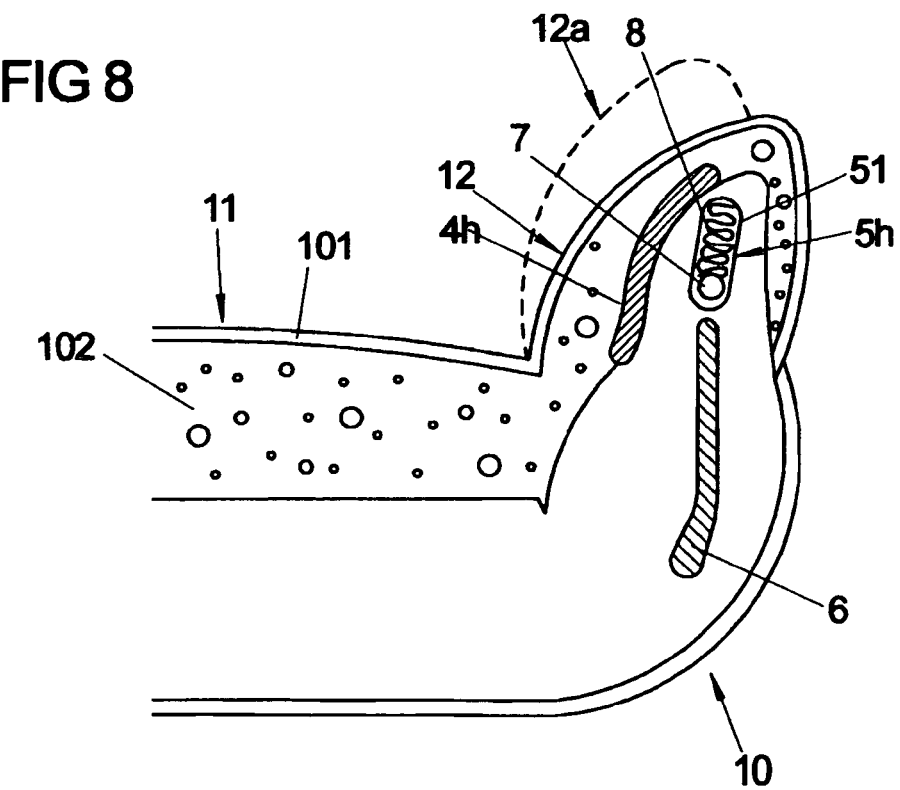
FIG. 8 schematically shows a sectional drawing through a vehicle seat in accordance with an eighth embodiment, in which a gas bag module is arranged before a seat frame with respect to the longitudinal axis of the vehicle.

FIG. 7 shows a gas bag module 5*g* which is part of the vehicle seat and which is arranged in the side bolster 12. The gas bag module 5*g* comprises a gas generator 7 and a gas bag 8 as well as a module housing 51 which encloses both the gas generator 7 and the gas bag 8.

In the side bolster, the gas bag module 5*g* and the gas bag 8 are completely arranged before the seat frame 6. Between the gas bag module 5 and the part of the seat frame 6 an adjusting element 4*g* is arranged, which consists of two legs 41*a* and 41*b* which substantially are bent to form a U-shape. The adjusting element here is formed in one piece. The substantially U-shaped adjusting element 4*g* serves to adjust the width of the backrest, wherein by means of the adjusting element 4*g* in particular the distance of the side bolster 12 to the middle part 11 can be varied by moving one or both of the legs of the adjusting element relative to the middle part.

The adjusting element is arranged such that it is located between the seat frame 6 and the gas bag module 5*g*. The gas bag module 5*g* is arranged on that side of the adjusting element 4*g* from which the two legs 41*a* and 41*b* are facing away. The two legs 41*a* and 41*b* in part engage around the seat frame 6 on two sides which are located opposite each other. One of these sides faces the middle part of the vehicle seat, the other side faces away from the middle part of the vehicle seat.

In FIG. 8 the vehicle seat again comprises a gas bag module 5*h* which includes a gas generator 7 and a gas bag 8, which are surrounded by a module housing 51. The gas bag module 5*h* is located before the part of the seat frame 6. Here, the arrangement is completely made with respect to the longitudinal axis of the vehicle before the seat frame 6.

The gas bag module 5*h* is formed such that it has a main direction of extension and extends substantially oblong with respect to the cross-section through the backrest 10 of the vehicle seat in the side bolster 12 substantially along the longitudinal axis of the vehicle in the vehicle seat mounted in the motor vehicle. In addition, the vehicle seat includes an adjusting element 4*h* in the side bolster 12, which is arranged completely before the seat frame 6 of the vehicle seat. The adjusting element serves to adjust the width of the backrest. For this purpose, the adjusting element 4*h* is formed to be movable and can be moved with respect to the middle part of the vehicle seat. A movement of the adjusting element 4*h* with respect to the middle part of the vehicle seat in particular results in a change in position of the side bolster. For example, when a movement of the adjusting element 4*h* is effected in forward direction with respect to the condition of the seat mounted in the vehicle and/or by swiveling the adjusting element 4 and hence the side bolster 12 about an axis, the width of the seat is varied. The adjusting element 4 is arranged on that side of the gas bag module 5*h* which faces the middle part 11. As a result, the adjusting element 4*h* extends on that side of the seat frame which faces the middle part 11.

The adjusting element 4*h* for the most part is arranged before the seat frame 6 with respect to the longitudinal direction of the vehicle.

FIG. 9 shows a sectional drawing through the backrest of a vehicle seat. The vehicle seat comprises a gas bag module 5*i* which includes a gas generator 7 and a gas bag 8, which are surrounded by a module housing 51. The module housing 51 in part is arranged in the side bolster 12.

The module housing 51 substantially is L-shaped and with the two inner surfaces of its L-shape is arranged adjacent to the seat frame 6. The module housing 51 extends along the part of the seat frame 6 such that it is arranged on a side which faces away from the middle part 11 of the seat. The vehicle seat furthermore includes an adjusting element 4*i* which with respect to the seat frame 6 for the most part is arranged before this seat frame in direction of longitudinal extension. One part of the adjusting element 4*i* is located on that side of the seat frame 6 which faces the middle part 11. The adjusting element 4*i* is formed such that it serves to adjust the width of the backrest 10. The adjusting element 4*i* in particular is formed to be movable with respect to the middle part 11 of the vehicle seat, so that by means of a movement of the adjusting element 4*i* a variation of the position of the side bolster 12 is effected, which is at least partly carried along with the adjusting element 4*i*.

According to FIG. 10 the vehicle seat includes a gas bag module 5*j* which comprises a gas generator 7 and a gas bag 8, which are enclosed by a module housing 51. The gas bag module 5*j* here is arranged on a side of the seat frame 6 which faces the middle part 11 of the vehicle seat. The gas bag module 5*j* extends substantially oblong along a main direction of extension, which in the vehicle seat mounted in the motor vehicle points in direction of the longitudinal axis of the vehicle.

The vehicle seat depicted in FIG. 10 in addition includes an adjusting element 4*j*, which in the side bolster 12 completely lies before the seat frame 6 with respect to the longitudinal axis of the vehicle.

Here, part of the gas bag module 5*j* is arranged such that it is located between the adjusting element 4 and the part of the seat frame. The adjusting element 4*j* serves to adjust the width of the backrest. For this purpose, the adjusting element 4*j* is formed to be movable relative to the middle part 11 of the seat. By moving the adjusting element 4*j* relative to the middle part, the side bolster at least partly carried along likewise is moved relative to the middle part 11. In this way, an adjustment of the width of the backrest is achieved via an adjustment of the relative position of the side bolster 12 with respect to the middle part.

Figure 11:
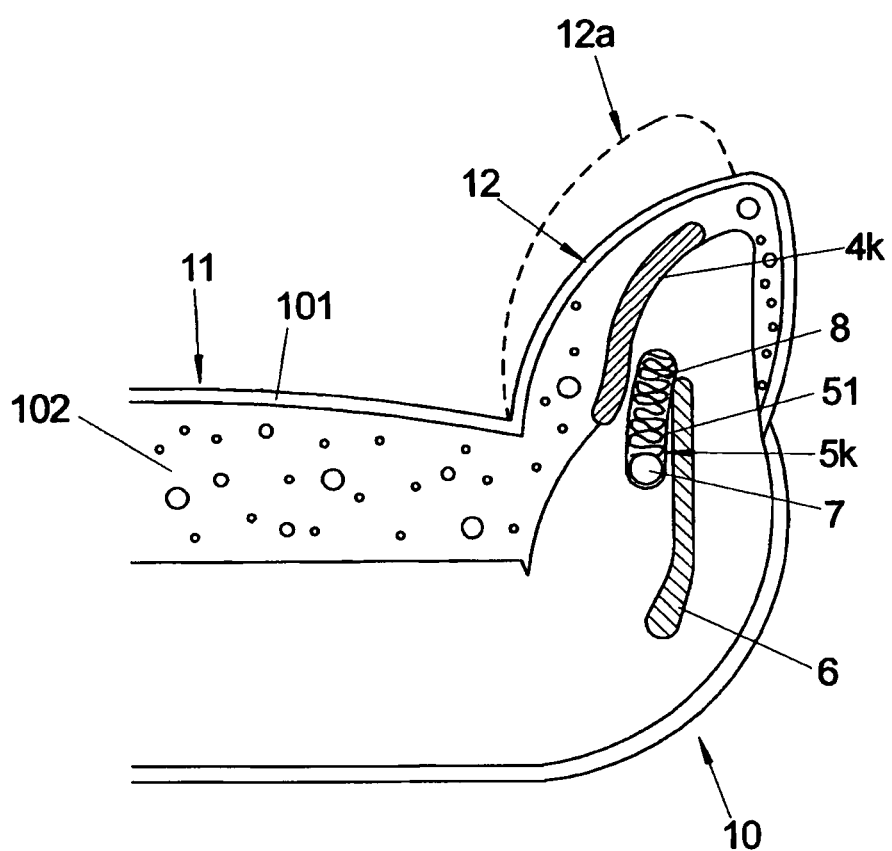
FIG. 11 schematically shows a sectional drawing through a vehicle seat in accordance with an eleventh embodiment, in which a substantially oblong gas bag module is arranged substantially parallel to the longitudinal axis of the vehicle and a seat frame which extends along the longitudinal axis of the vehicle.

FIG. 11 shows a sectional drawing of a vehicle seat, which includes a gas bag module 5*k* which comprises a gas generator 7 and a gas bag 8, which are surrounded by a module housing 51. The gas bag module 5*k* here is arranged along the part of the seat frame 6 which in the vehicle seat mounted in the motor vehicle substantially extends along the longitudinal axis of the vehicle. It is arranged on that side of the part of the vehicle seat which faces the middle part.

Furthermore, it includes an adjusting element 4k which serves to adjust the width of the backrest. Here, the adjusting element 4k is movable with respect to the middle part 11 and the adjusting element 4k substantially is formed in the side bolster 12, so that by means of a movement of the adjusting element relative to the middle part 11 the side bolster 12 at least partly carried along is moved relative to the middle part 11.

The embodiments of FIGS. 10 and 11 substantially differ in that the adjusting element of FIG. 11 has a greater length with respect to its main direction of extension than the adjusting element of FIG. 10, so that the adjusting element of FIG. 11 no longer completely, but only for the most part lies before the seat frame 6 with respect to the longitudinal axis of the vehicle.

The priority application, German Patent Application Number 10 2009 020 154.8, filed on May 6, 2009, is incorporated by reference herein in its entirety.

What is claimed is:

1. A vehicle seat of a motor vehicle, comprising:
    a backrest which includes a middle part and at least one side bolster,
    a gas bag module with a folded gas bag, which is at least partly arranged in the side bolster,
    an adjusting element for adjusting a width of the backrest, which is at least partly arranged in the side bolster and is movable relative to the middle part, by means of which a position of the side bolster relative to the middle part can be varied, and
    a seat frame extending in the side bolster, which in the vehicle seat mounted in the motor vehicle is aligned along a longitudinal axis of the vehicle,
    wherein at least part of the folded gas bag is arranged before the seat frame with respect to the longitudinal axis of the vehicle,
    wherein the adjusting element is formed by a module housing of the gas bag module,
    wherein the module housing is configured to be movable such that a relative position of the module housing with respect to the middle part is adjustable via a rotary movement or a swivel movement to adjust the position of the side bolster relative to the middle part,
    wherein the adjusting element is configured to be movable to different stable adjusting positions, the different stable adjusting positions corresponding with different widths of the backrest, and
    wherein the module housing is configured to be rotationally pivotable about an axis which corresponds with a longitudinal axis of a gas generator.

2. A vehicle seat of a motor vehicle, comprising:
    a backrest which includes a middle part and at least one side bolster,
    a gas hag module with a folded gas bag, which is at least partly arranged in the side bolster,
    an adjusting element for adjusting a width of the backrest, which is at least partly arranged in the side bolster and is movable relative to the middle part, by means of which a position of the side bolster relative to the middle part can be varied, and
    a seat frame extending in the side bolster, which in the vehicle seat mounted in the motor vehicle is aligned along a longitudinal axis of the vehicle,
    wherein at least part of the folded gas bag is arranged before the seat frame with respect to the longitudinal axis of the vehicle,
    wherein the adjusting element is formed by a module housing of the gas bag module,
    wherein the module housing is configured to be movable such that a relative position of the module housing with respect to the middle part is adjustable via a rotary movement or a swivel movement to adjust the position of the side bolster relative to the middle part,
    wherein the adjusting element is configured to be movable to different stable adjusting positions, the different stable adjusting positions corresponding with different widths of the backrest,
    wherein the gas bag module includes a gas generator for inflating the gas bag, and
    wherein the module housing is actively pivotable about an axis which corresponds with a longitudinal axis of the gas generator.

* * * * *